April 6, 1971     G. O. ECCLES     3,574,075
METHOD OF PRODUCING AN ELECTRODE
FOR USE IN ELECTRO MACHINING
Filed March 21, 1969

INVENTOR
GEORGE OSWALD ECCLES

By
Cushman, Darby & Cushman
ATTORNEYS 3,574,075
METHOD OF PRODUCING AN ELECTRODE FOR
USE IN ELECTRO MACHINING
George O. Eccles, Thornton-in-Craven, Skipton, England,
assignor to Rolls-Royce Limited, Derby, England
Filed Mar. 21, 1969, Ser. No. 809,257
Int. Cl. B23p 1/00; C23b 7/02
U.S. Cl. 204—143                                           8 Claims

ABSTRACT OF THE DISCLOSURE

An electrode for use in electromachining is made by producing a former having a surface corresponding to the working surface of the electrode to be produced, electro-depositing a metallic layer onto the said surface of the former, and effecting relative separation between the former and the said layer.

---

Figure 1:
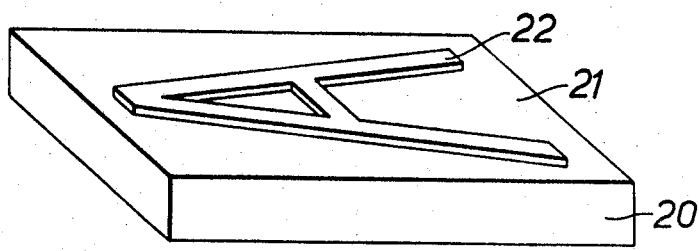

This invention concerns a method of producing an electrode for use in electromachining such, for example, as either spark machining or electro-chemical machining.

Electrodes for use in electromachining, which electrodes have normally been made of copper, have hitherto been made by a series of milling operations. Such operations, however, extend over a very considerable time because of the close tolerances required, and have therefore been very costly. Moreover, where the electrode is used for spark machining, the electrode surface becomes blackened and deeply pitted and must be removed from the machine after each time it is used so as to re-dress the working surface thereof. Such re-dressing is itself a very lengthy procedure, and can only be performed a few times.

According therefore to the present invention, there is provided a method of providing a passage in a blank formed by two mating parts from which blank an aerofoil section blade is subsequently produced comprising producing a former having at least one raised portion, electrodepositing a metallic layer onto the said surface of the former, effecting relative separation between the former and the said layer to produce an electrode having a working surface corresponding to the surface of the former, said working surface having at least one raised portion corresponding to the at least one raised portion on the former, using an electrode so produced to form a groove in each part of the blank so as to provide the passage in the blank when the two mating parts of the blank are assembled.

The said layer may be backed with backing material.

As will be appreciated, the present invention enables the electrode to be made very much more cheaply so that it is economically practicable to discard it after one single spark machining operation.

The former preferably has a melting point substantially below that of the said layer and may be separated from the latter by melting it. Thus the former may be made of wax or of a low melting point alloy.

The former may be made of a conducting material. Alternatively, it may be made of a non-conducting material, in which case the said surface thereof is coated with conducting material prior to the said electro-deposition.

The said layer is preferably a copper layer, and the said backing material is preferably also metallic.

The said working surface may have at least one recessed portion. Thus the electrode may be for use in electromachining a cooling air passage in a part of an aerofoil blade, the said portion being adapted in operation to produce a part of a cooling air passage corresponding thereto.

The invention also comprises an electrode for use in electromachining when made by the method set forth above.

Additionally, the invention comprises a method of electromachining an article in which use is made of such an electrode. Thus the article may be an aerofoil blade having a cooling air passage which has been produced therein by the use of the said electrode.

Figure 2:
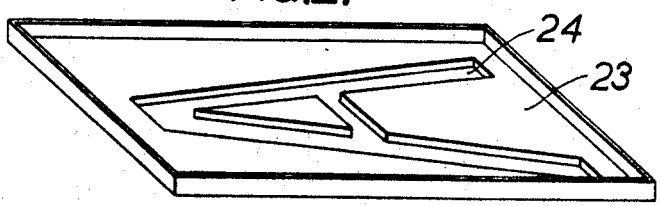
Figure 3:
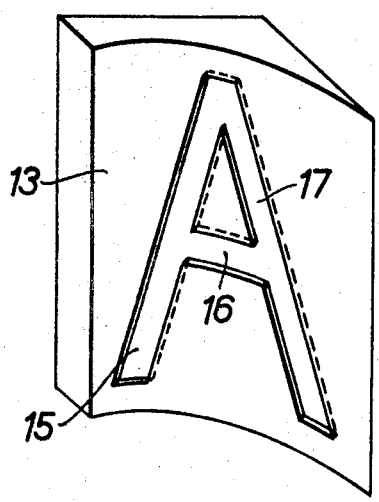
Figure 4:
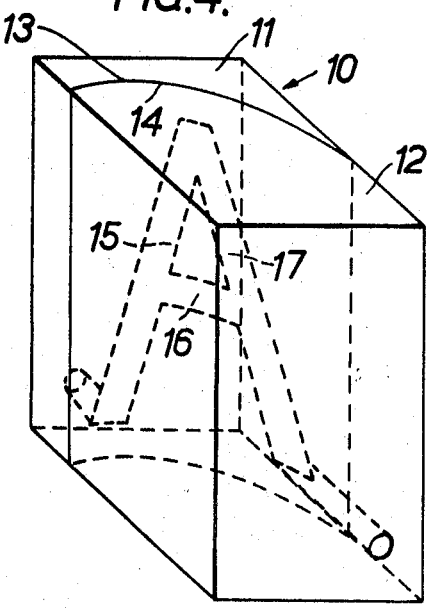

The invention is illustrated, merely by way of example, in the accompanying drawings, in which:

FIG. 1 is a diagrammatic perspective view of a former which may be used in the formation of an electrode in accordance with the present invention, FIG. 2 is a diagrammatic perspective view of a metallic layer produced by employing the former of FIG. 1, FIG. 3 illustrates part of a two-part blade blank which has been formed with cooling air passages by an electrode incorporating the metallic layer of FIG. 2, and FIG. 4 is a diagrammatic perspective view of the two part blank prior to the machining of the latter to form a finished aerofoil blade.

In FIG. 4 there is shown a blank 10 which may be machined to form an aerofoil blade for use in a gas turbine engine. The blank 10 is formed in two parts 11, 12, having corresponding adjacent curved surfaces 13, 14 which have been brazed together. As will be noted, the surfaces 13, 14 although curved are not cylindrical in shape, whereby relative rolling movement therebetween is prevented. Each of the parts 11, 12 has raised portions 15, 16, 17 which form the boundary walls of cooling air passages (not shown). The raised portions 15 to 17 are produced in the parts 11, 12 by a spark machining process employing an electrode (not shown). The said electrode is itself produced by the method described below, the electrode having recessed portions in the working surface thereof so as to be capable of forming the raised portions 15 to 17.

In order to form the said electrode a former 20 (FIG. 1) is made which has a surface 21 corresponding to the working surface of the electrode, the former being made of a low melting point material such, for example, as a wax or a low melting point alloy. One such alloy, for example, contains 50% bismuth, 30% lead and 20% tin and another such alloy is a 50/50 tin/lead solder, but the preferred alloy is that sold under the trademark Cerrobend.

The former 20 is produced by casting the low melting point alloy around a solid steel master electrode (not shown) disposed in a suitable container (not shown). When the alloy has solidified, the casting is extracted and quenched in cold water. As a result, raised portions 22, which correspond to the recesses of the final electrode, are formed in the former 20.

An assembly (e.g. of six) of such formers 20 are jigged together, after each of them has had the surfaces thereof which are not to be plated coated with an air drying epoxy resin varnish. They are then subjected to electrolytic alkali cleaning and dried, and are etched by dipping the assembly in 25% nitric acid for 5 seconds. The assembly is then given a thorough wash with an air-water blast and is then transferred to an air agitated electrolytic copper cyanide bath maintained at 50° C. Plating using periodic reverse current, may be started at a low current density of approximately 5 amps per square foot for 30 minutes, and may be gradually increased to 20 amps per square foot when a smooth covering of copper on the surface 21 has been obtained. The concentration of the copper cyanide salt may be 162 grams/litre. A thickness of 0.002" copper per hour is thus built up and after achieving a thickness of 0.080" to 0.100", the assembly may be removed, given a thorough cold water swill, and dried.

In order to effect relative separation between the copper layer 23 (FIG. 2) so produced (which will thus have recesses 24 formed therein) and the former 20, the epoxy resin varnish may be mechanically removed, and, if desired, a cut may be made around the side of the plated former, the cut being sufficiently deep to penetrate into the material of the former 20. The plated former may then be suspended in a beaker of boiling water when, after a few minutes, the former will melt to leave a self-supporting copper layer 23.

If desired, in order to prevent adhesion of the material of the former 20 to the layer 23, the former 20 may be initially treated with a colloidal graphite, or with a molybdenum disulphide, coating.

Alternatively, or additionally, the separation may be effected by blasting the former 20 with a steam jet. This will effect removal of most of the material of the former, the remainder thereof being dissolved by immersion in saturated copper nitrate solution for a maximum of one minute and thereafter by a quick dip of 5 to 10 seconds in cold 50% nitric acid solution.

The layer 23 may then be washed in clean running water and degreased in acetone, after which it may be machined.

In order to reinforce the layer 23 so produced, so as both to improve its rigidity and operative life and to improve its heat dissipation properties, the layer 23 may, if desired, be backed by a backing material. The latter may be constituted by solder or by sprayed copper, but it is preferred to employ brazing wire such, for example, as that sold under the trademark "Easiflo."

Thus, the layer 23, while resting on a ceramic support, may have its reverse side backed by Easiflo No. 2 brazing wire, and may then be loaded into an air-tight brazing box. The box may then be purged with a steady flow of argon for 15 minutes and thereafter with a flow of hydrogen for a further 45 minutes. After yet a further 10 minutes, the exhaust gas from the brazing box may be lit and the brazing box may be pushed half-way into an electric furnace maintained at 810° C. The cold end may be supported and the furnace mouth plugged with a shaped ceramic brick. After 30 minutes, the brazing box may be removed and allowed to air cool for 20 minutes. Further purging with argon may then take place for 10 minutes when the electrode may be removed.

The former, instead of being made of a low melting point material, may be formed of certain plastic materials which may be injection moulded in quantity, thus producing a former with accurate detail and reproduction. Prior to electro-forming, a conducting coating may be applied to such a former by silver lacquering, silver-mirroring or vacuum deposition.

The method of the present invention may also be used to produce nickel electrodes.

I claim:
1. A method of providing a passage in a blank formed by two mating parts, from which blank an aerofoil section blade is subsequently produced, said method comprising the steps of:
   producing a former having a surface with at least one raised portion,
   electro-depositing a metallic layer onto the said surface of the former,
   effecting relative separation between the former and the said layer to produce an electrode having a working surface corresponding to the said surface of the former, said working surface having at least one raised portion corresponding to the at least one raised portion on the former, and
   using an electrode so produced to form a groove by electromachining in each mating part of the said blank so as to provide a passage in the blank when the two mating parts of the blank are assembled.
2. A method as claimed in claim 1 in which the former has a melting point substantially below that of the said layer and is separated from the latter by melting it.
3. A method as claimed in claim 2 in which, portions of the said former which continue to adhere to the said layer after the said melting are removed by a steam blast.
4. A method as claimed in claim 2 in which, portions of the said former which continue to adhere to the said layer after the said melting are removed by a chemical treatment.
5. A method as claimed in claim 1 in which the former is made of non-conducting material, but the said surface thereof is coated with conducting material prior to the said electrodeposition.
6. A method as claimed in claim 1 in which the said layer is a copper layer.
7. A method as claimed in claim 1 in which the said layer is backed with backing material.
8. A method as claimed in claim 7 in which the backing material is metallic.

References Cited
UNITED STATES PATENTS

| | | | |
|---|---|---|---|
| 2,229,457 | 1/1941 | Kimball | 204—6 |
| 2,400,518 | 5/1946 | Kreber et al. | 204—6 |
| 3,257,717 | 6/1966 | Wilkinson et al. | 204—224 |
| 3,513,282 | 5/1970 | Fox | 204—143 |

OTHER REFERENCES
Don't Overlook Electroforming, W. H. Safranek, Product Engineering, June 5, 1961.

JOHN H. MACK, Primary Examiner

T. TUFARIELLO, Assistant Examiner

U.S. Cl. X.R.

204—4, 12